7834X
J. & J. Reed,
Pump Lift,
Patented Nov. 19, 1833.
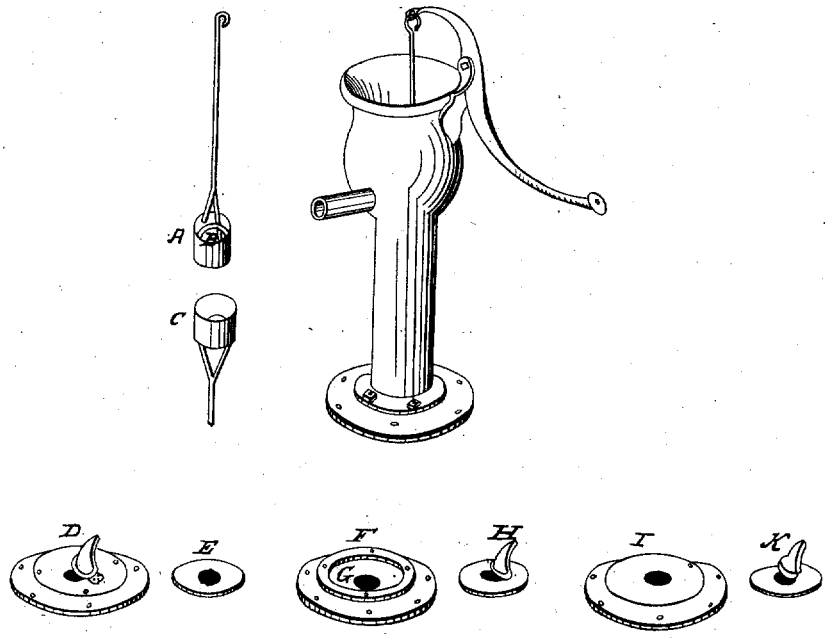
N. PETERS, PHOTO-LITHOGRAPHER, WASHINGTON, D. C.

X7834 Nov 19 1833 163.

Jesse Reed & Josiah Reed
Letters Patent

The Schedule referred to in these Letters Patent and making part of the same containing a description in the words of the said Jesse Reed & Josiah Reed them selves of their improvement in the Cast Iron Pump.

The principle parts of the machine consist of a perpendicular hollow cylinder with its flange - bottom plates valves piston all made of cast iron or other suitable metal and lever or break, lead pipe, screw & bolt. The body of the pump or cylinder is about two feet long with a calibre or bore from two to four inches in diameter according, to the quantity of water required to be raised. At the bottom of the cylinder there is a horizontal projection or flange about eight inches in diameter. The piston of the pump is about three inches long of a size adapted to the bore of the cylinder and is grooved on its circular side for receiving rope yarn or any other packing, substance which may be required to make the piston move sufficiently close, and tight. The bottom part of the piston to the height in the centre of about one inch and a half from near its circular edge to a perpendicular hole passing, thro' the piston, is made concave in the form of the upper part of a funnel inverted. The valve in the piston rests horizontally on a shoulder about one eighth of an inch wide, and is placed at the lower end of the hole where the said hole opens into the concave bottom part of the piston. A rod of suitable size & length is attached to the upper side of the piston, and the top part connected by a joint with the lever or brake. The parts of the pump beneath the flange of the cylinder are adjusted in three different modes as may be preferred. In the first mode a plate about twelve inches in in diameter and of a suitable thickness for the strength re-
quired, with a hole in the centre about one inch & a half
diameter is placed under the horizontal flange of the cyl-
inder. This plate has a circular elevation on the upper
side between the centre and circumference, about one inch
wide for the purpose of holding more firmly the screws which
pass thro' this elevated part from the flange and is de-
pressed within the elevation so as to receive within its
bed another plate about four inches in diameter and half
an inch in thickness. This small plate has a hole in the
centre. corresponding with that in the large or main plate
beneath, with a valve attached on the upper side. A lead
pipe passes from the water thro' the hole in the large plate
and about one half inch thereof is turned over nearly at a
right angle between the plates and covered with a piece
of leather of the same width. The central part [of] the upper
side of the small plate is raised about one eighth of an
inch and being of the same diameter with the bore of the
cylinder enters & forms a close joint therein. That part
of the plate not wired is covered with leather of such thick-
ness as to make the surface under the flange of the cylin
der level and all the parts compact and tight when
brought together by the screws which pass through the
said flange & the thick & elevated part of the large or
main plate. In the second mode, the lead pipe passes
thro' a hole about one & a half inch over, in the centre of a
plate nearly eight inches in diameter and half an inch
in thickness & turned over as in the preceding mode —
This plate is inclosed or embedded centrally and hori-
zontally in the under side of another plate about one foot
in diameter so that the under sides of both plates may
form an even or level surface. A hole is made in the
large or main plate of the same size with the one in [illegible]

~~[illegible]~~ X 7834 the small plate beneath & directly over the same having
a valve attached thereto on the upper side. the parts are se-
cured and made compact by screws which pass thro the
flange of the cylinder & the main plate and screw in
to the small plate. In the third mode, a plate a-
bout twelve inches diameter having a hole in the centre
of the size above mentioned is placed horizontally under
the flange of the cylinder. The lead pipe passes thro'
this aperture and is turned down nearly at a right
angle so as to fill a counter sink in the plate to a
level surface. Another plate about half an inch thick
and of the requisite diameter with a hole in the centre to
correspond with that in the plate last above mentioned
is inserted in the lower end of the cylinder having its
lower side on a level with the lower side of the horizon-
tal flange of the cylinder. In putting the parts togeth-
er, the screws pass thro' the flange & screw into the main
plate. The lower valve which is of the same form and
operates in the same way in all the different modes of
arranging the plates; consists of a horizontal and cir-
cular plate about one third of an inch in thickness with
a diameter a little exceeding that of the hole over which it
is placed and of another plate of nearly the same thick-
ness, placed on the upper side and across the diameter
of the horizontal plate its widest sides being at a right
angle with the same. The latter plate is of an oval
form at the top and its narrow sides or edges decline
about ten degrees from a perpendicular toward the
side where the valve opens to its greatest extent. This
valve beside opening in the ordinary way may be opened
& kept open as long as is necessary by raising the brake
of the pump & bringing down the concave or funnel like surface
of the bottom part of the piston. upon & against that side
of

X7834 of the oval top of the valve, directly opposite to the joint of the valve. the top of the valve at the same time pressing against & raising the valve in the piston. In this way water in the cylinder may be let off at pleasure, and the important object attained of guarding effectually against the effects of frost in the cold season of the year.

The improvements claimed are the different modes or methods of adjusting the plates and connecting with them the flange of the pump and lead pipe. and the mode or method of letting off the water from the cylinder by raising the brake to its greatest extent and opening the valves. Said improvements are claimed as they are respectively set forth and described in this specification Witnesses
Bathsheba Whitman
Aaron Hobart Jesse Reed
Josiah Reed (Draw portfolio)

Ex'd.
W.G.

[illegible]